US010346928B2

(12) United States Patent
Li et al.

(10) Patent No.: US 10,346,928 B2
(45) Date of Patent: Jul. 9, 2019

(54) RANKING MEMBERS BASED ON INFLUENCE SCORE

(71) Applicant: Microsoft Technology Licensing, LLC, Redmond, WA (US)

(72) Inventors: Xuan Li, Sunnyvale, CA (US); Yi Feng, Sunnyvale, CA (US); Weizhen Wang, San Jose, CA (US); Min Lu, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/282,934

(22) Filed: Sep. 30, 2016

(65) Prior Publication Data

US 2017/0091193 A1 Mar. 30, 2017

Related U.S. Application Data

(60) Provisional application No. 62/235,462, filed on Sep. 30, 2015.

(51) Int. Cl.
*G06F 16/00* (2019.01)
*G06Q 50/00* (2012.01)

(52) U.S. Cl.
CPC .................................... *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,280,597 B2 * | 3/2016 | Ghosh | G06F 16/9535 | |
| 9,454,586 B2 * | 9/2016 | Ghosh | G06F 16/382 | |
| 9,886,514 B2 * | 2/2018 | Ghosh | G06F 16/9535 | |
| 10,032,180 B1 * | 7/2018 | Shariff | G06Q 30/0202 | |
| 2011/0313989 A1 * | 12/2011 | Ghosh | G06F 16/9535 | 707/706 |
| 2013/0218862 A1 * | 8/2013 | Ghosh | G06F 16/382 | 707/706 |
| 2016/0203221 A1 * | 7/2016 | Rao | G06Q 50/01 | 707/707 |
| 2016/0232248 A1 * | 8/2016 | Ghosh | G06F 16/9535 | |
| 2017/0091193 A1 * | 3/2017 | Li | G06Q 50/01 | |
| 2019/0012682 A1 * | 1/2019 | Shariff | G06Q 30/0202 | |

* cited by examiner

*Primary Examiner* — Farhan M Syed
(74) *Attorney, Agent, or Firm* — Schwegman Lundberg & Woessner, P.A.

(57) ABSTRACT

Techniques for ranking members based on an influence score are described. For example, an influence score process can access, from a database in an online social network, member data of a first member in response to receiving a ranking request of the first member. Additionally, a contribution factor for each first-degree connection of the first member can be determined. A centrality score for the first member can be determined based on the contribution factor for each first-degree connection of the first member. Moreover, an expertise score for the first member can be determined based on the member data of the first member. Furthermore, an influence score of the first member can be calculated based on the centrality score and the expertise score. Subsequently, a user interface is configured to cause a presentation, on a display of a device, of the ranking of the first member based on the influence score.

19 Claims, 6 Drawing Sheets

RANKING MEMBERS BASED ON INFLUENCE SCORE

PRIORITY CLAIM

This application claims priority under 35 U.S.C. 119(e) to U.S. Provisional Patent Application Ser. No. 62/235,462, filed Sep. 30, 2015, which is incorporated herein by reference in its entirety.

TECHNICAL FIELD

The subject matter disclosed herein generally relates to the technical field of data processing and specifically to calculating a member's influence score in an online social network. In some instances, the member is ranked using the influence score.

BACKGROUND

An online social network can maintain information on members, companies, organizations, employees, and employers. The online social network may maintain profile pages of members, which can include education information, employment information, and location information about a specific member. Additionally, the online social network can store information about a member's relationships (e.g., connections) with other members of the online social network.

In some instances, a user of the online social network may want to search for an influential member. Often, some useful information to connect to the influential member may be missing or otherwise unavailable to the user.

BRIEF DESCRIPTION OF THE DRAWINGS

Some embodiments are illustrated by way of example and not limitation in the figures of the accompanying drawings.

DETAILED DESCRIPTION

Figure 1:
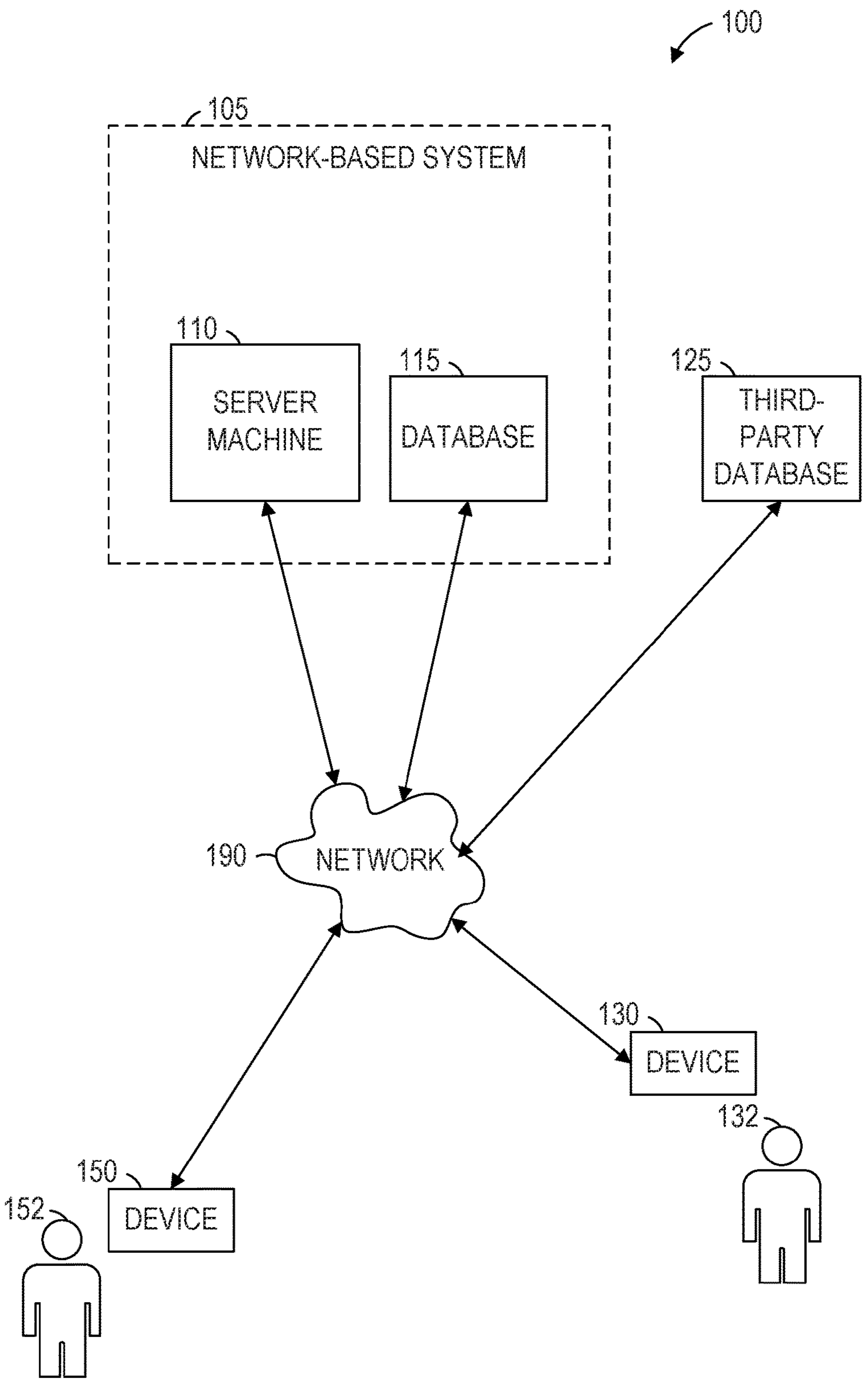
FIG. 1 is a network diagram illustrating a network environment suitable for an online social network, according to some example embodiments.

Example methods and systems are directed to techniques for calculating a member's influence in an online social network. More specifically, the present disclosure relates to methods, systems, and computer program products for ranking members using the member's influence score. Techniques for calculating the influence score are described herein.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some instances, a ranking of a member in the online social network can simply be associated with the number of profile views that the member's profile page received over a predetermined amount of time (e.g., a month). However, by just using the number of profile views a member has received, the ranking of members may not accurately reflect the influence of the member in the online social network.

According to some embodiments, the online social network can accurately rank members using an influence score. For example, the influence score of a first member can more accurately measure the influence of the first member in the online social network. Additionally, the influence score of the first member can be calculated for the whole network, or for a subgroup (e.g., using an industry, a location, a company, a job title, a degree, a school) within the online social network.

In some instances, the influence score can be determined using a centrality score of the first member and an expertise score of the first member. For example, the centrality score and the expertise score can be added or averaged together to determine the influence score. Alternatively, the influence score can be calculated by multiplying the centrality score of the first member by a first coefficient and multiplying the expertise score of the first member by a second coefficient. The centrality score of the first member can depend on the contribution factors of the first-degree connections of the first member. The expertise score of the first member can depend on the skills possessed by the first member, the degrees obtained by the first member, the employment history of the first member, and other skill-related information of the first member.

With regards to the determination of the centrality score, the centrality score can be the summation of the contribution factor of the first-degree connections of the first member. The centrality score can be calculated using, but not limited to, an eigenvector centrality algorithm, a Katz centrality algorithm, a betweenness centrality algorithm, a closeness centrality algorithm, a degree centrality algorithm, or a harmonic centrality algorithm. Moreover, the centrality score can be further based on a damping factor associated with a page rank value and a strength of connection value.

In the eigenvector centrality algorithm example, the centrality score of the first member can be the summation of the contribution factor of the first-degree connections, and each contribution factor is equally weighted. Additionally, the contribution factor of a first-degree connection can equal to the centrality score of the first-degree connection. The contribution factors of each member can be predetermined by the online social network and stored in the member database. In the a Katz centrality algorithm, the centrality score of the first member can further depend on the contribution factor of the second-degree connections of the first member.

Additionally, the centrality score of the first member can further depend on the damping factor of information created (e.g., published, posted) by the first member. For example, the damping factor corresponds to the speed that information is passed to the whole network or section of the network through the connections of the first member. Moreover, the centrality score of the first member can further depend on a strength of connection value between the first member and a first-degree connection. For example, the contribution factor of a first-degree connection is weighted in direct correlation to the strength of connection between the first member and the first-degree connection.

With regards to the determination of the expertise score, the expertise score can be calculated using profile data of the first member. The profile data includes educational information (e.g., school, degree, major, graduation year) and professional information (e.g., job title, company, seniority, job description, years of experience). The profile data can also include a list of skills possessed by the first member. Additionally, the expertise can be further calculated using third-party data such as a ranking of schools or a ranking of company. In some instances, the profile data of the first member is compared against the profile data of members with a similar profile attribute (e.g., job title, degree, company) to determine an expertise score. For example, a first software developer having 10 years of experience can have a higher expertise score than a second software developer having just one year of experience.

Once the influence score is calculated, the ranking of the first member in relation to the first-degree connections is determined by comparing the influence score of the first member and the first-degree connections. For example, the first member is ranked first when the influence score of the first member is higher than the influence score of the first-degree connections. The influence score of the first-degree connections can be calculated using similar methods as calculating the influence score of the first member.

Techniques described herein allow for the determination of a member's influence in the online social network based on an influence score. Additionally, a ranking or search result of the members can be presented using the influence score of each member. The influence score can be based on the profile data, the social graph data, and the activity data of the member. Additionally, the influence score can be based on third-party data.

FIG. 1 is a network diagram illustrating a network environment 100 suitable for an online social network service, according to some example embodiments. The network environment 100 includes a server machine 110, a database 115, a third-party database 125, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store, but is not limited to storing, member data, company data, education data, social graph data, and member activity data for the online social network service. In some instances, the database 115 can include a plurality of databases (e.g., a first database to store profile data, a second database to store social data, a third database to store member activity data). The server machine 110, the first device 130, and the second device 150 may each be implemented in a computer system, in whole or in part, as described below with respect to FIG. 6.

The third-party database 125 can store third-party data such as employer ranking, school ranking, and other information relevant to determine the expertise of a member. The third-party data can also include published articles, published projects, online tutorial websites, patents, group memberships. The server machine 110 can access the information in the third-party database 125 using the network 190.

Also shown in FIG. 1 are the users 132 and 152. One or both of the users 132 and 152 may be a human user (e.g., member of the online social network), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any of the machines, databases, or devices described herein may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices described herein may be combined into a single machine, database, or device, and the functions described herein for any single machine, database, or device may be subdivided among multiple machines, databases, or devices.

In some current implementations, a member can be ranked based on the number of profile views. For example, a first member with more profile views from registered users of the online social network can be ranked higher than a second member that has fewer profile views. However, the ranking of a member can easily fluctuate with the member's recent activity, and may not evaluate the member's overall influence within the member's professional network.

According to some embodiments, the ranking can be based on an influence score. The influence score can accurately measure a member's influence within the professional network. In some instances, the influence score can represent how fast information created by a member is passed to the whole network through connections between members. For example, the influence score can be used to determine the key structure node in a graph and the most influential members in the online social network. Additionally, a ranking of members can be generated based on the influence score of each member.

According to some embodiments, the influence score of a first member depends only on the centrality score of the first member. The centrality score of the first member can be the summation of all the first member's first-degree connections contribution factors. In some instances, a contribution factor of a first-degree connection equals the centrality score of the first-degree connection. For example, the first member's centrality score increases as the number of first-degree connections of the first member increases. Additionally, the centrality score of the first member can be higher than a second member, when the contribution factors of the first-degree connections of the first member are higher than the contribution factors of the first-degree connections of the second member.

In some instances, the influence score further depends on an expertise score of the first member. The expertise score of the first member can be determined using the employment data and educational data of the first member. Additionally, the expertise score can be further determined using skills listed on the profile page of the first member. For example, the influence score is determined using Equation 1.

$$\text{Influence Score}=C_0(\text{Centrality Score})+C_1(\text{Expertise Score}),\text{ where } C_0 \text{ and } C_1 \text{ are coefficients with a range from 0 to 1.} \quad \text{(Equation 1)}$$

There can be many different ways to calculate the centrality score. In some instances, the centrality score can be based on an eigenvector centrality algorithm. The eigenvector centrality may only consider the contribution factor from the first-degree connections and equally weight the contribution factor for each first-degree connection.

In the eigenvector centrality algorithm example below, the influence score is calculated using the eigenvector centrality algorithm. In this example, it is assumed that there are v nodes in the network G. The v nodes can represent the first-degree connections of a first member, and the network G can represent the network of the first member. Alternatively, the network G can represent a network associated with a profile attribute (e.g., location, job title, school), and the v nodes can represent a subgroup of members in the online social network having the profile attribute. In yet another alternative, the v nodes can represent all the members in the online social network, and the network G can represent the online social network. For example, the contribution factor of a member can be determined when v nodes can represent all the members in the online social network, and the network G can represent the online social network. Given the amount of processing power to determine the contribution factor, the calculation of the contribution factor can be done periodically (e.g., nightly) using an offline processor and stored as member data in the database 115.

Continuing with eigenvector centrality algorithm example, a v×v dimensional adjacency matrix A can be used to represent all connections, which can be undirected. An adjacency matrix is a square matrix used to represent a finite graph. The elements of the matrix indicate whether pairs of vertices are adjacent or not in the graph.

Matrix A's element $a_{ij}=a_{ji}=1$ if there is a connection between node i and node j and $a_{ij}=a_{ji}=0$ otherwise. The centrality score of node i can be defined as $X_i$, where:

$$x_i = \frac{1}{\lambda}\Sigma_{j\in G}a_{ij}\times x_j \text{ where } \lambda \text{ is a constant.} \quad \text{(Equation 2)}$$

In the example in Equation 2, $X_i$ can represents the centrality score of the first member, and $X_j$ can represent the contribution factor of a first-degree connection of the first member. As previously mentioned, the contribution factor of the first-degree connection can equal or be directly correlated to the centrality score of the first-degree connection. Additionally, in some instances, the contribution factor of a member can be obtained from the third-party database 125, such as when the contribution factor is calculated by a third-party. Additionally, $a_{ij}$ can be a value from 0 to 1. In one example, the $a_{ij}$ value can be based on a strength of connection value between node i and node j. Furthermore, in one example, λ can be selected based on the number of nodes in the network or set by an administrator.

Continuing with the eigenvector centrality algorithm example, when the contribution factor equals or is directly related to the centrality score, the centrality score of the first member can be the summation of the centrality scores of all the first-degree connections of the first member. For example, the centrality score of all members can initially be set at 1, and the centrality score of each member changes in each iteration to equal the summation of the centrality score of all the first member's first-degree connections. The iterations keep repeating until the equation for calculating the centrality score of each member stabilizes. The centrality score of each member is determined once the equations for calculating the centrality score of each member stabilizes. Once the centrality score of each member in the network is determined, then the centrality score for each member is updated based on a change in the network. A change in the network occurs when a new member is added to the network, a member is deleted from the network, two members form a new connection, or two members remove a connection. It should be noted that once the centrality scores for each member is initially determined, the determination of the updated centrality score based on a change is much less time consuming. Equations 2-5 further describe the eigenvector centrality algorithm example.

Additionally, Equation 2 can be rewritten into an eigenvector equation as:

$$AX=\lambda X \quad \text{(Equation 3).}$$

Furthermore, matrix A is a real symmetric matrix because $a_{ij}=a_{ji}$ and the value of a could be 0 or 1. A symmetric matrix is a square matrix that is equal to its transpose.

By definition, matrix A is also a Hermitian matrix which has the property that all its eigenvalues are real and matrix A has v linearly independent eigenvectors. A Hermitian matrix, or self-adjoint matrix, is a complex square matrix that is equal to its own conjugate transpose, where the element in the $i^{th}$ row and $j^{th}$ column is equal to the complex conjugate of the element in the $j^{th}$ row and $i^{th}$ column, for all indices i and j.

Accordingly, the eigenvalues can be calculated using power iteration (e.g., Von Mises iteration). The power iteration is an eigenvalue algorithm, where given the matrix A, the algorithm will produce a number λ (the eigenvalue) and a nonzero vector v (the eigenvector), such that Av=λv. The power iteration can be a simple algorithm, which reduces the processing time for calculating the centrality score. For example, the power iteration does not compute a matrix decomposition, and hence it can be used when matrix A is a very large sparse matrix. Additionally, the power iteration will find only one eigenvalue (the one with the greatest absolute value).

The eigenvalues can be calculated using power iteration as described in Equation 4, where at any step k:

$$x_i(k+1) = \frac{Ax_i(k)}{\|Ax_i(k)\|}. \quad \text{(Equation 4)}$$

In Equation 4, the || || represents (e.g., means) normalization. Additionally, the iteration of Equation 4 will stop when:

$$x_i(k+1)-x_i(k)<\epsilon \quad \text{(Equation 5)}$$

Although the eigenvector centrality algorithm may converge slowly, the eigenvector centrality algorithm finds only the greatest (e.g., highest) eigenvalue. The centrality score of the first member is determined using the eigenvalue once the eigenvector centrality algorithm converges.

According to other embodiments, the centrality score can be based on a Katz centrality algorithm. The Katz centrality algorithm can calculate the centrality score of the first member based on multiple levels of connections (e.g., first-degree, second-degree, third-degree) of the first member. Additionally, contribution factors from connections that are levels away can attenuate exponentially with number of levels. For example, the contribution factor for the first-degree connections and the second-degree connections of the first member are used to calculate the centrality score of the first member.

Moreover, the centrality score can be further calculated using a damping factor associated with each connection of the first member. As previously mentioned, the influence score can be based on a first coefficient (e.g., $C_0$) multiplied by the centrality score. The first coefficient (e.g., $C_0$) associated with centrality score can be inversely correlated to the damping factor. For example, when the damping factor increases, the coefficient of the centrality score decrease. The damping factor can exemplify the possibility that the transmission of information from the first member can be terminated at a connection or sent to another user not following the connections. In some instances, the damping factor for a connection is determined using a page rank value associated with the profile page of the connection. For example, the centrality score for the first member can be calculated using a damping factor associated with each first-degree connection of the first member. The damping factor can be directly correlated, or equal, to a page rank value associated with each profile page of the first-degree connections of the first member. The page rank value can be accessed from the third-party database 125 or from the database 115 as member data.

Furthermore, the centrality score can be further calculated using a strength of connection value. The strength of connection can also be applied to create a dynamically changing weight associated with each contribution factor of a first-degree connection of the first member. For example, the strength of connection value between a first member and a second member can be dependent (e.g., directly correlated) on the number of common connections between the first member and the second member. A common connection is a member that is a first-degree connection to both the first member and the second member. Additionally, the first coefficient (e.g., $C_0$) associated with centrality score can be directly correlated to the strength of connection value(s).

In addition to the centrality score, the influence score can be calculated using an expertise score. In some instances, the influence score is based only on the expertise score. The expertise score of a first member can correspond to the expertise of the first member. The expertise score of the first member can be determined using the member data of the first member. The member data includes profile data and social graph data. Moreover, the online social network can access third-party data to determine the expertise score. The third-party data can include school rankings, company rankings, and other rankings. For example, the expert score for a member can be based on the school attended by the member and the ranking of the school based on the school rankings accessed from the third-party data.

According to some embodiments, once an influence score has been calculated based on the determined centrality score and/or expertise score, the influence score can be used to automatically select influencers for a global network or local network. For example, the professional network of a first member can be efficiently extended by searching and connecting to an influential member. An influential member is a member with an influence score above a predetermined threshold. The predetermined threshold can be set by an administrator of the online social network. In some instances, a suggestion can be presented to the first member to connect or follow the influential member. Additionally, during a search request of a member, the online social network can generate a search result with the influential member listed first based on the influence score of the influential member.

The online social network can calculate the influence score for each member to evaluate the member's influence in the online social network. Additionally, the centrality algorithms (e.g., eigenvector centrality algorithm) can be used to calculate the centrality score. For example, the eigenvector centrality algorithm example above uses a power iteration to solve the equation and determine the centrality score. In some instances, the influence score can be used to find influencers in the online social network. Additionally, the influence score can help members grow their professional network by connecting them with more influential members. For example, a salesperson can use the influence score in targeting the right customer.

In some instances, a user of the online social network may want to search for a member. The search request can include a first name and a last name. The online social network can generate the search result for the search request using the influence score, the centrality score, or the expertise score of the members with the same first name and last name associated with the search request. For example, the member with the highest influence score can be presented first on the search result.

According to some embodiments, an indexing process can use the influence score to rank members based on information available in the online social network. The indexing process allows for faster processing and faster return of search results. For example, a higher ranking in the search results can be given to a member with more influence based on the influence score.

Figure 2:
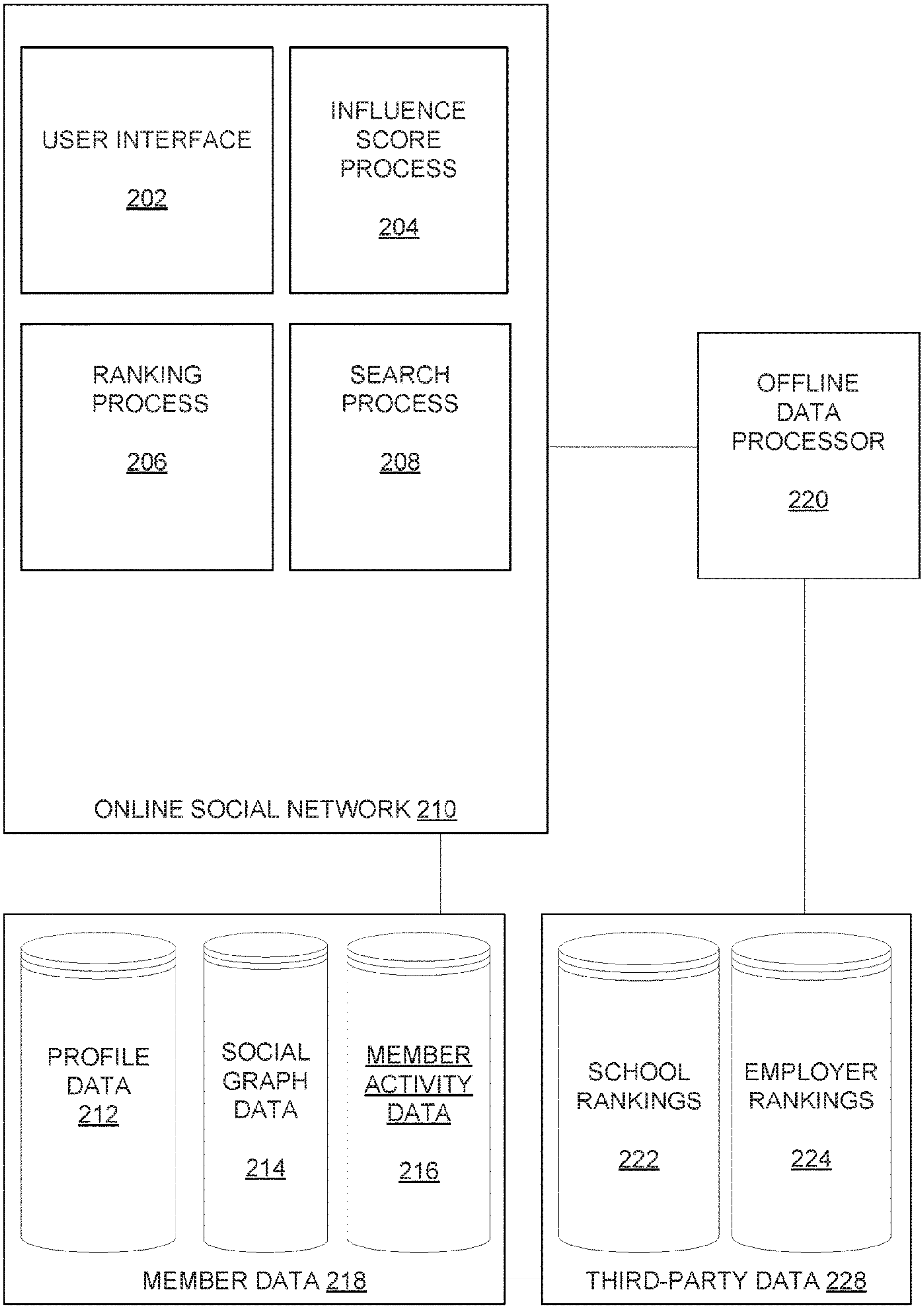
FIG. 2 is a block diagram illustrating various components of an online social network, according to some example embodiments.

FIG. 2 is a block diagram illustrating components of an online social network 210, according to some example embodiments. The online social network 210 is an example of a network-based system 105 of FIG. 1. The online social network 210 can include a user interface 202, an influence score process 204, a ranking process 206, and a search process 208, all configured to communicate with each other (e.g., via a bus, shared memory, or a switch).

Additionally, the online social network 210 can communicate with the database 115 of FIG. 1 storing member data 218. Furthermore, the online social network 210 can communicate with the third-party database 125 of FIG. 1 storing third-party data 228. Using the member data 218 and the third-party data 228, the influence score of a member can be determined. In some instances, some of the processing of the data for the determination can be performed by an offline data processor 220 on a periodic basis (e.g., nightly) in order to return faster search results.

The user interface 202 provides information or causes an interface to be rendered on a client device of a member. The user interface 202 presents the rankings of members or the search results on a display of the client device. Additionally, the user interface 202 can receive a search request by a member, with the search request including a first name and/or a last name. The interactions of the member are captured by the user interface 202. As later described, the interactions include, but are not limited to, the member interacting with the ranking results, the search results, or the search request.

The member data 218 can include profile data 212. The profile data 212 includes educational information, employer information, certifications, skillsets, endorsements, recommendations, publications, patents, and projects of the member. The profile data 212 can be used to determine the influence score or the expertise score of a member. In some instances, the influence score process 204 can calculate an influence score or an expertise score for a member using the profile data 212.

For instance, when a user registers to become a member, the member is prompted to provide a variety of personal and employment information that may be displayed in a member's profile page. The profile data 212 that is commonly requested and displayed as part of a member's profile includes the member's age, birthdate, gender, interests, contact information, residential address, home town and/or state, spouse's and/or family members' names, educational background (e.g., schools, majors, matriculation and/or graduation dates, etc.), employment history, office location, skills, professional organizations, and so on. In some embodiments, the profile data 212 may include the various skills that each member has indicated he or she possesses. Additionally, the profile data 212 may include skills of a member that have been endorsed by another member.

Additionally, the profile data 212 can include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Furthermore, the profile data 212 may include the various skills that each member has indicated he or she possesses. Additionally, the profile data 212 may include an endorsement. The endorsement can be a skill for which a member has been endorsed in the profile data. Additionally, a recommendation of a member can be received from another member. The recommendation can include a keyword associated with the specific skill.

Moreover, the member data 218 can include social graph data 214 and member activity data 216. The social graph data 214 of a member can include first-degree connections, second-degree connections, and so on. Additionally, online social network services provide their users with a mechanism for defining their relationships with other people. This digital representation of real-world relationships is frequently referred to as a social graph, which may be stored in the social graph data 214.

In some instances, the social graph data 214 can be based on an entity's presence within the online social network service. For example, consistent with some embodiments, a social graph is implemented with a specialized graph data structure in which various entities (e.g., people, companies, schools, government institutions, non-profits, and other organizations) are represented as nodes connected by edges, where the edges have different types representing the various associations and/or relationships between the different entities.

Furthermore, the social graph data 214 may be maintained by a third-party social network service. For example, users can indicate a relationship or association with a variety of real-world entities and/or objects. Typically, a user input is captured when a user interacts with a particular graphical user interface element, such as a button, which is generally presented in connection with the particular entity or object and frequently labeled in some meaningful way (e.g., "like," "+1," "follow"). For example, the centrality score or the influence score of a first member increases as the first member attains more followers. With more followers, the information published by the first member can be dispersed faster to more members.

In addition to hosting social graph data 214, the member data 218 includes member activity data 216. The online social network 210 may provide a broad range of other applications and services that allow members the opportunity to share and receive information, often customized to the interests of the members. In some embodiments, members may be able to self-organize into groups, or interest groups, organized around subject matter or a topic of interest. In some embodiments, the online social network 210 may host various job listings providing details of job openings with various organizations.

The member activity data 216 can include members' interaction with the various applications, services, and content made available via the online social network 210, and the members' behavior (e.g., content viewed, links selected, etc.) may be used to determine an expert.

The third-party data 228 includes school rankings 222, employer rankings 224, a contribution factor for a member, a page rank value for a profile page of a member, other rankings, and other metrics to help determine the expertise score, the centrality score and the influence score of a member. The school rankings 222 can include education rankings of schools published by a media company. The school rankings 222 can depend on a type of degree (e.g., bachelor's degree, graduate degree), a field of study (e.g., engineering, business), a location (e.g., country, region of a country). Additionally, the employer rankings 224 can rank employers. The employer rankings can depend on the industry (e.g., legal, medical, banking, consulting, technology), the job title (e.g., doctor, consultant, banker), and location.

For example, the influence score process 204 can access the third-party data 228 to determine the ranking of a first company and a first school. Subsequently, the expertise score of a member having graduated from the first school and currently working at the first company is determined based on the rankings accessed from the third-party data 228.

The influence score process 204 can use the profile data 212 (e.g., educational information, employment information) to determine the expertise score of a member. Additionally, the influence score process 204 can further determine the expertise score based on the third-party data 228. Moreover, the influence score process can use the social graph data 214 and member activity data 216 to determine the centrality score of the member. The influence score of the member can be calculated using the expertise score and the centrality score. Subsequently, the ranking process 206 can use the influence score to rank members based on their influence. Additionally, the search process 208 can use the ranking from the ranking process 206 to present the members in a search result. The search process 208 can present, to a user 132, an influential member to follow or connect to using the influence score of the influential member.

Furthermore, the online social network 210 can be configured to process data offline or periodically using the offline data processor 220. In some instances, some or all of the influence score process 204 or the ranking process 206 can be performed by the offline data processor 220. For example, the offline data processor 220 can include one or more large-scale processing servers, such as an Apache™ Hadoop® server, that access the member data 218 and the third-party data 228 periodically (e.g., on a nightly basis) in order to determine the expertise score and the centrality score of a member. Processing the member data 218, may be computationally intensive. Therefore, some of the calculating (e.g., Equations 1-5) and ranking can be done offline, such as one or more parameters associated with the expertise score and the centrality score. By having the one or more parameters calculated offline, less real-time processing time may be needed by the influence score process 204 in order to calculate the influence score for each member. As a result, these parameters can be input in the influence score process 204 in order to rank a member in real-time in order to almost instantaneously present search results.

Figure 3:
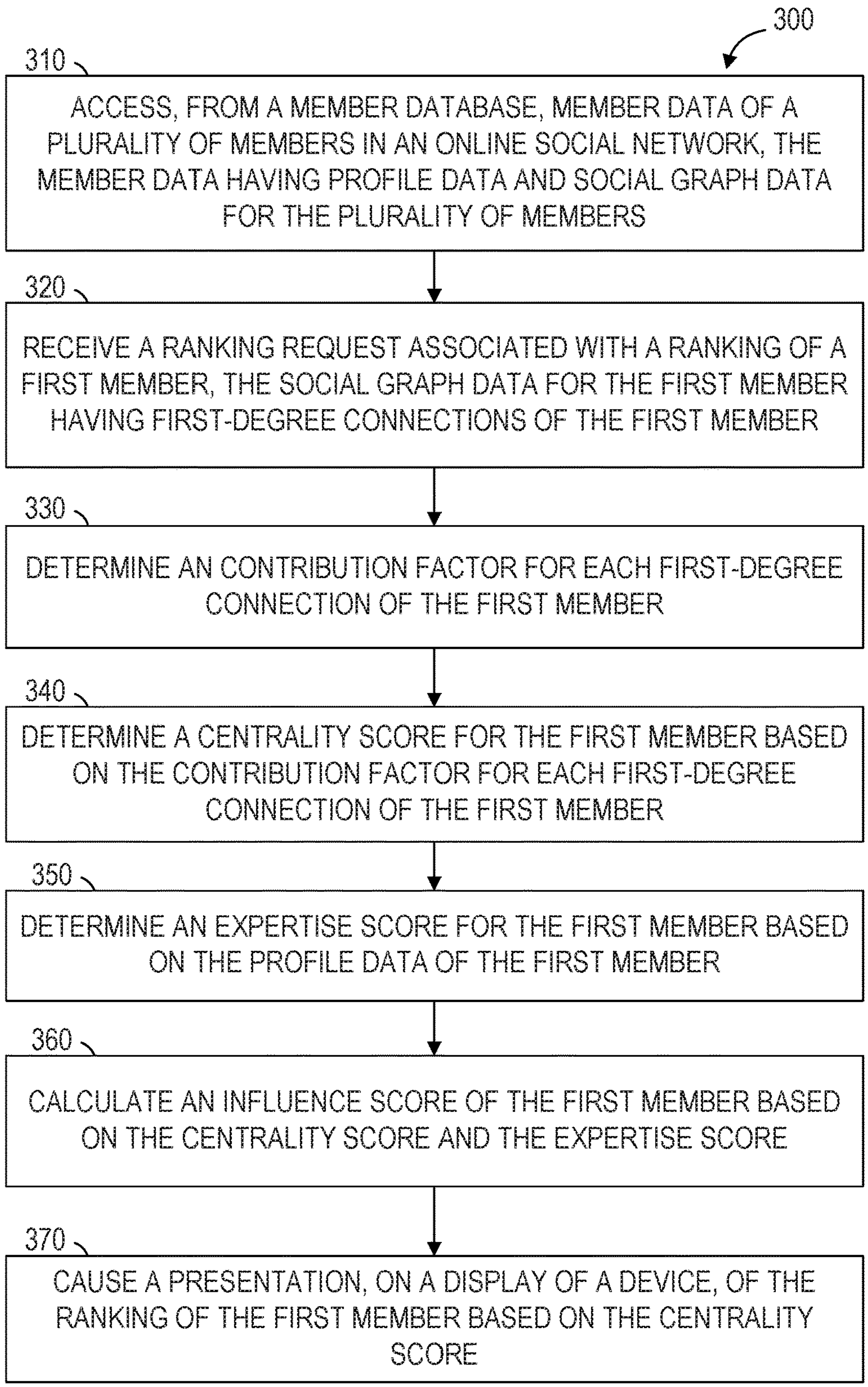
FIG. 3 is a flowchart illustrating operations of the online social network in performing a method for calculating an influence score and ranking a member using the influence score, according to some example embodiments.

As will be further described with respect to FIG. 3, the influence score process 204, in conjunction with the user interface 202, the ranking process 206, and the search process 208, can calculate an influence score for a member and rank the member using on the influence score. Additionally, using the ranking, a search result can be presented to the user 132. Moreover, using the ranking, an influential member can be suggested to the user 132 to connect to or follow.

FIG. 3 is a flowchart illustrating operations of the online social network 210 in performing a method 300 for calculating an influence score of a member and ranking the member using the influence score, according to some example embodiments. Operations in the method 300 may be performed by the network-based system 105, using the influence score process 204, the ranking process 206, and the search process 208 described above with respect to FIG. 2.

At operation 310, the influence score process 204 accesses member data 218. The member data 218 can be accessed from a member database, such as the database 115. The database 115 stores member data 218 of a plurality of members in the online social network 210. The member data 218 includes profile data 212 and social graph data 214 for the plurality of members. The influence score process 204 can access the member data 218 from database 115 via network 190 of FIG. 1.

As previously mentioned, the profile data 212 includes employment information and educational information of a member in the plurality of members. Additionally, the social graph data 214 includes first-degree connections of a member in the plurality of members. Furthermore, the member data 218 can include member activity data 216 of a member.

At operation 320, the user interface 202 receives a ranking request associated with a ranking of a first member, with the first member being a member of the plurality of members in the online social network 210. The member data accessed at operation 310 includes the social graph data 214 of the first member, which includes the first-degree connections of the first member. The ranking request can be received from the first device 130 of the first user 132 via network 190 of FIG. 1.

In some instances, the ranking request includes a profile attribute. When the ranking request includes the profile attribute, the first member is ranked in relation to other members having the same profile attribute. For example, when the profile attribute is an employer of the first member, the ranking list is based on a subgroup of the online social network 210, with the subgroup of members being other employees of the employer. Alternatively, when the profile attribute is a job title of the first member, the subgroup of members are members having the same job title listed on a profile page.

At operation 330, the influence score process 204 determines a contribution factor for each first-degree connection of the first member. In some instances, the contribution factor of a first-degree connection is directly correlated or equal to the centrality score of the first-degree connection. In one example, the member data accessed at operation 310 further includes a contribution factor for each first-degree connection of the first member. Accordingly, the contribution factor for each first-degree connection of the first member can be accessed from the database 115. In another example, the contribution factor is obtained from the third-party data 228.

In one example, the contribution factor of a member can be the centrality score of the member in relation to all members in a network (e.g., online social network 210). Equations 2-5 describe an example of calculating the centrality scores of members in a network. As previously mentioned, the contribution factor for a member of the online social network 210 can be calculated using Equation 1 from above, when v nodes can represent all of the members in the online social network, and the network G can represent the online social network. Given the amount of processing power to determine the contribution factor, the calculation of the contribution factor can be done periodically (e.g., nightly) using an offline processor and stored as member data 218 in the database 115.

At operation 340, the influence score process 204 determines a centrality score for the first member based on the contribution factor for each first-degree connection of the first member. In some instances, the centrality score for the first member is determined by adding together the contribution factor for each first-degree connection of the first member. For example, the centrality score calculated at operation 340 is higher than average (e.g., average across the network) when the first-degree connections are more influential. A processor in the server machine 110 can perform the determination in real-time. In some instances, part of the determination at operation 340 can be performed offline using the offline data processor 220.

The centrality score can be calculated using, but is not limited to, an eigenvector centrality algorithm, a Katz centrality algorithm, a betweenness centrality algorithm, a closeness centrality algorithm, a degree centrality algorithm, or a harmonic centrality algorithm. Moreover, the influence score can be further based on a damping factor or a strength of connection value between the first member and a first-degree connection.

In some instances, the centrality score for the first member is calculated using an eigenvector centrality algorithm. Equations 2-5 described an example of calculating the centrality score using an eigenvector centrality algorithm. Additionally, in the eigenvector centrality algorithm, the contribution factor for each first-degree connection has an equal weight.

In some instances, the centrality score for the first member is calculated using a Katz centrality algorithm. In the Katz centrality algorithm, the centrality score is further based on contribution factors associated with second-degree connections of the first member.

Additionally, the centrality score for the first member can be further dependent on a damping factor for each first-degree connection of the first member. The damping factor for each first-degree connection of the first member can corresponds to a page rank value associated with a profile page of each first-degree connection of the first member. The page rank value can be obtained from the member data 218 or the third-party data 228.

Moreover, the centrality score for the first member can be further dependent on a strength of connection value between the first member and a first-degree connection. As previously described, the strength of connection value can be dependent on a number of common connections between the first member and the first-degree connection. The contribution factor for each first-degree connection is weighted using the strength of connection value between the first member and the first-degree connection. In another example, the strength of connection value can be directly correlated to a connection density between the first member and the first-degree connection.

Furthermore, the centrality score for the first member can be dependent on the number of followers following the first member, or the number of followers following a first-degree connection of the first member.

At operation 350, the influence score process 204 determines an expertise score for the first member based on the profile data of the first member. For example, the profile data 212 accessed at operation 310 can include years of experience, and the expertise score is directly correlated to the years of experience. A processor in the server machine 110 can perform the determination in real-time. In some instances, part of the determination at operation 350 can be performed offline using the offline data processor 220.

Additionally, the profile data 212 can include a company name and a job title, and the expertise score is determined using the job title and the company name. A seniority level can be derived from the job title, and a company size can be obtained from the company name. The expertise score of the first member can be directly correlated to the seniority level of the first member. Furthermore, the expertise score of the first member can be directly correlated to the company size. For example, the first member can have a high expertise score (e.g., above 80 out of 100) if the first member is an executive (e.g., high seniority level) at a large company (e.g., more than 100 employees).

In some instances, the influence score process 204 can calculate an expertise score for a member using the educational information. The educational information can include the name of the school, the degree attained, and a grade point average (GPA) of the member. The name of the school can be used to determine the ranking of the school. For example, the expertise score, and therefore the influence score, can be directly correlated to the ranking of the school Additionally, the expertise score can depend on the degree attained and the GPA of the member.

For example, the profile data of the first member accessed at operation 310 can include a school attended by the first member. The influence score process 204 can access the school ranking for the school attended by the first member. Additionally, the influence score process 204 can update the expertise score for the first member based on the school ranking for the school attended by the first member. As previously described, the third-party data 228, stored in the third-party database 125, can include school rankings 222. The influence score process 204 can access the third-party database 125 via network 190 of FIG. 1.

In some instances, the influence score process 204 can calculate an expertise score for a member using the employment data. The employment data includes a job title, a position with a current employer, projects completed as an employee, seniority, years of experience, published papers, patents, portfolio, certifications, and awards. In some instances, the seniority (e.g., years of experience) of the member can be used to determine the expertise score of the member. For example, an executive of a company can have a higher influence score than an entry-level employee of the company. Moreover, the size of the company can affect the influence score. For example, an executive of a large company (e.g., based on market capitalization, based on the number of employees) can have a higher influence score than an executive of a smaller company.

For example, the profile data of the first member accessed at operation 310 can include a first employer of the first member. Additionally, the influence score process 204 can access, from the third-party database 125, the employer rankings 224 for the first employer of the first member. Furthermore, the influence score process 204 can update the expertise score for the first member based on the employer ranking for the first employer. As previously mentioned, the third-party data 228, which includes the employer rankings 224, can be stored in the third-party database 125. The influence score process 204 can access the third-party database 125 via network 190 of FIG. 1.

Furthermore, the profile data can include recommendations and endorsements that can be used to determine the expertise score. For example, the expertise score can be directly correlated to the number of skills listed on the profile page of the first member.

At operation 360, the influence score process 204 calculates an influence score of the first member based on the centrality score and the expertise score. In another embodiment, the influence score can be based on the centrality score or the expertise score. As previously discussed, Equations 1-5 describe an example eigenvector algorithm for calculating the influence score of the first member. A processor in the server machine 110 can perform the calculations at operation 360 in real-time. In some instances, part of the calculation at operation 360 can be performed offline using the offline data processor 220.

For example, the influence score is calculated by multiplying the centrality score for the first member by a first coefficient and multiplying the expertise score for the first member by a second coefficient as described in Equation 1. The influence score can equal the summation of the centrality score multiplied by the first coefficient and the expertise score multiplied by a second coefficient. In one example, both the first and second coefficients can equal 1. Alternatively, an administrator of the online social network 210 can set the values of the first and second coefficients.

In some instances, the influence score for the first member is calculated using an eigenvector centrality algorithm. In the eigenvector centrality algorithm, the contribution factor for each first-degree connection has an equal weight.

In some instances, the influence score for the first member is calculated using a Katz centrality algorithm. In the Katz centrality algorithm, the influence score is further based on contribution factors associated with second-degree connections of the first member.

Additionally, the influence score for the first member can be further dependent on a damping factor for each first-degree connection of the first member. The damping factor for each first-degree connection of the first member corresponds to a page rank value associated with a profile page of each first-degree connection of the first member.

Moreover, the influence score for the first member can be further dependent on a strength of connection value between the first member and a first-degree connection. The contribution factor or influence score for each first-degree connection is weighted using the strength of connection value between the first member and the first-degree connection. For example, the $a_{ij}$ from Equation 2 can be based on the strength of connection value. The strength of connection value can be determined using similar techniques as determining a connection density between the first member and the first-degree connection.

At operation 370, the user interface 202 causes a presentation, on a display of a device, of the ranking of the first member based on the influence score. The device at operation 370 can be the first device 130 of first user 132, which sent the ranking request at operation 320. Alternatively, the device at operation 370 can be the second device 150 of the second user 152. The ranking can be in relation to the first-degree connections of the member. A processor in the server machine 110 can perform the ranking in real-time. In some instances, part of the ranking at operation 370 can be performed offline using the offline data processor 220.

In some instances, method 300 further includes the influence score process 204 to calculate an influence score for each first-degree connection of the first member. Calculation of an influence score for each first-degree connection can be similar to the techniques described at operations 330, 340, 350, and 360. Additionally, the influence score process 204 or the ranking process 206 can generate a ranking list of the first member and the first-degree connections of the first member based on the influence score of the first member and the influence score for each first-degree connection of the first member. For example, the ranking list can rank each member by listing the member with the highest influence score at the top of the list and the member with the lowest influence score at the bottom. Subsequently, the user interface 202 can further include the generated ranking list in the presentation at operation 370.

In some instances, method 300 can further include a search process 208 that receives a search request of a member. The search request has a first name and a last name that is associated with the first member. Additionally, the search process 208 can generate a search result based on the influence score of the first member. For example, the influence score is calculated at operation 360. Subsequently, the user interface 202 is further configured to present the generated search results. At operation 370, the user interface 202 or the search process 208 can cause a presentation, on a display of the device, the ranking of the member from operation 350. The presentation can include the name of the member and the member's ranking in relation to the first-degree connections, the member's ranking in relation to other similar members (e.g., based on job title, based on employer), the member's ranking in relation to all of the members in the online social network 210, and so on.

In some instances, the ranking request at operation 320 includes a profile attribute (e.g., job title, company, location) associated with the first member. When the ranking request includes the profile attribute, the influence score process 204 can generate a ranking list as described in method 400 of FIG. 4.

Figure 4:
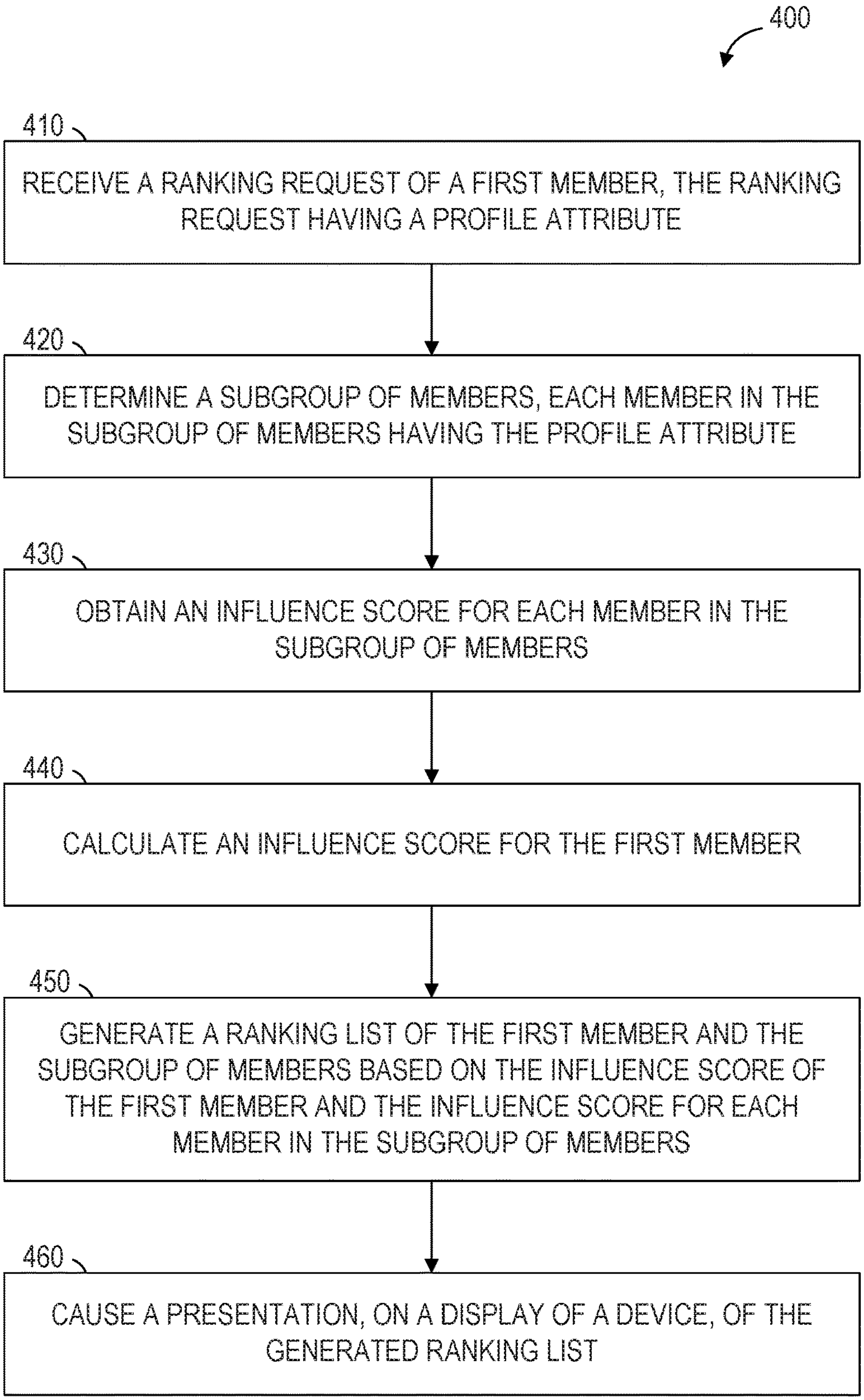
FIG. 4 is a flowchart illustrating operations of the online social network in ranking a member using an influence score, according to some example embodiments.

FIG. 4 is a flowchart illustrating a method 400 for ranking a member using a influence score, according to various embodiments. Operations in the method 400 may be performed by the network-based system 105, using modules described above with respect to FIG. 2.

At operation 410, the user interface 202 receives a ranking request of a first member. The ranking request includes a profile attribute (e.g., job title, company, location) associated with the first member. The ranking request can be similar to the request received at operation 310 in FIG. 3.

At operation 420, when the ranking request includes the profile attribute, the influence score process 204 can determine a subgroup of members from the plurality of members. The subgroup of members have the same profile attribute. For example, when the ranking request is associated with a ranking of the first member in relation to Company X, then the subgroup members include the employees of Company X. Alternatively, when the ranking request is associated with a ranking of the first member in relation to other software developers, then the subgroup members include software developers. A processor in the server machine 110 can perform the determination at operation 420 in real-time.

At operation 430, the influence score process 204 can calculate or obtain an influence score for each member in the subgroup of members. In some instances, the influence factor of each member in the subgroup of members can depend on the centrality score of each member in the subgroup of members. The centrality score and contribution score for each member in the subgroup can be stored as member data 218 in the database 115 of FIG. 1. The influence score for each member can be obtained using similar techniques described at operation 330 and at operation 360 in FIG. 3. A processor in the server machine 110 can obtain the influence scores in real-time.

Alternatively, the influence score process 204 can calculate an influence score for each member in the subgroup of members. Calculation of an influence score for each member in the subgroup can be similar to the techniques described at operations 330, 340, 350, and 360. Given the amount of processing power to determine the centrality score, the calculation of the centrality score can be done periodically (e.g., nightly) using an offline processor and stored as member data 218 in the database 115. In some instances, part of the calculation of the influence score can be performed offline using the offline data processor 220.

At operation 440, the influence score process 204 can calculate an influence score for the first member. Calculation of an influence score for each member in the subgroup can be similar to the techniques described at operations 330, 340, 350, and 360. A processor in the server machine 110 can perform the calculation at operation 440 in real-time. In some instances, part of the calculation of the influence score can be performed offline using the offline data processor 220.

At operation 450, the ranking process 206 can generate a ranking list of the first member and the subgroup of members based on the influence score of the first member and the influence score for each member in the subgroup of members. A processor in the server machine 110 can generate the ranking list at operation 450 in real-time.

Subsequently, at operation 460, the user interface 202 can further include the generated ranking list in the presentation. The presentation can be similar to the presentation described at operation 370.

Figure 5:
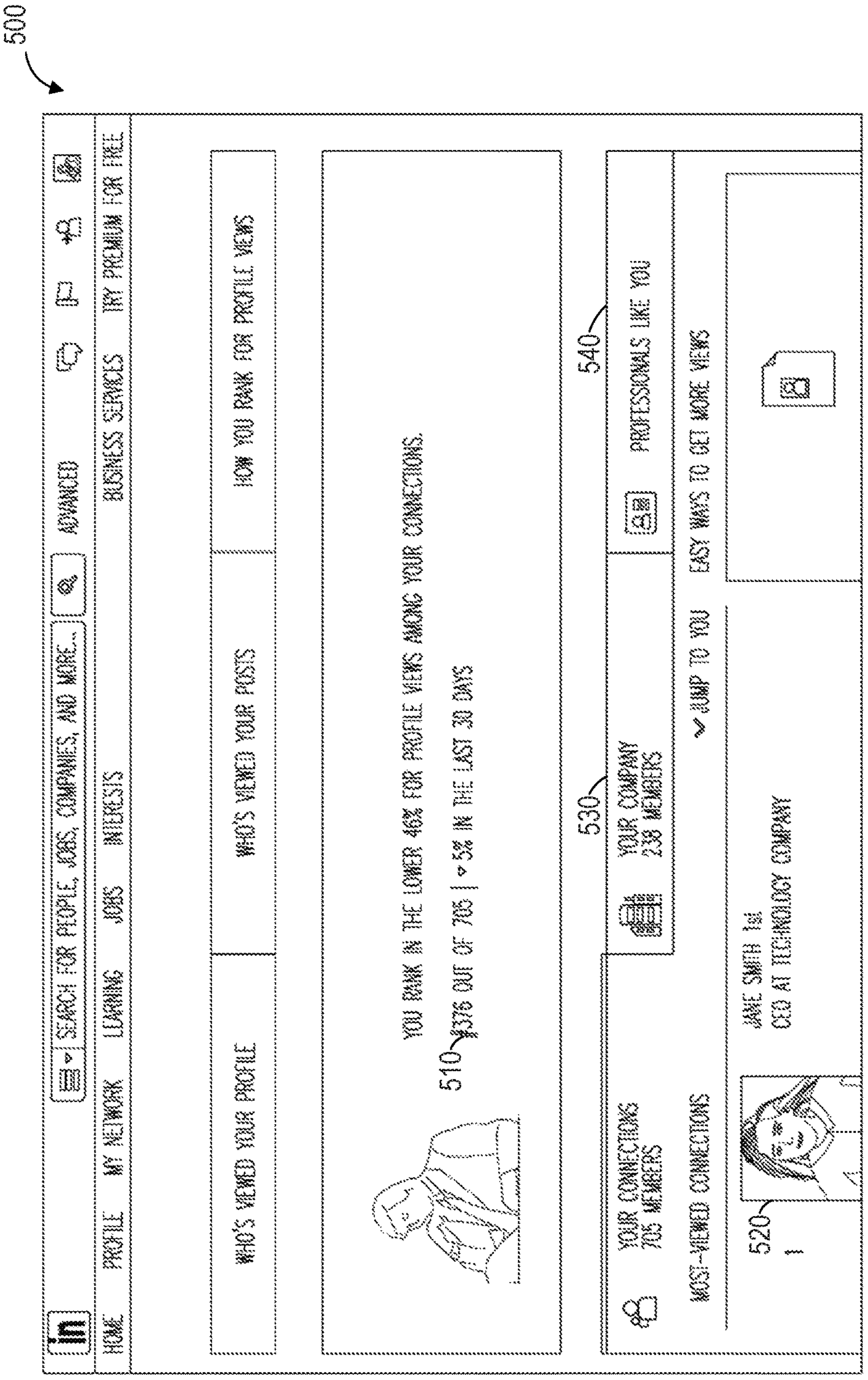
FIG. 5 is an example of a ranking feature using an influence score in a social network system, according to various embodiments.

FIG. 5 is an example of a ranking feature 500 in a social network 210, according to various embodiments. The ranking feature 500 includes the ranking of the first member 510 in relation to the first-degree connections of the first member. The ranking of the first member 510 is based on the influence score of the first member. For example, the first member is ranked 376 out of 705 first-degree connections. Additionally, the ranking feature 500 includes a first profile 520 with the highest influence score from all of the first-degree connections. Techniques for ranking the first member in relation to the first-degree connections are described in method 300, according to some embodiments.

Moreover, the ranking feature 500 includes a company feature 530 to rank the first member in relation to other employees in the company of the first member. Techniques for ranking the first member in relations to other employees are described in method 400, according to some embodiments. In the company feature 530 example, the members in the subgroup for method 400 are the members that currently work at the same company as the first member.

Moreover, the ranking feature 500 includes a professional feature 540 to rank the first member in relation to professionals similar to the first member. Techniques for ranking the first member in relation to similar professionals are described in method 400, according to some embodiments. In the professional feature 540 example, the members in the subgroup for method 400 are the members that have a job title that is similar (e.g., same) as the first member.

According to various example embodiments, one or more of the methodologies described herein facilitate the presentation of an influential member in a search based on the member data 218. Additionally, based on the database structure illustrated in FIG. 2, the ranking can be sent to a member in real-time by using the offline data processor 220 for some calculations. For example, the online social network 210 can use the offline data processor 220 for the influence score process 204, in such a way as to allow an efficient retrieval and processing of the information in order to present the influence score in real-time.

When these effects are considered in aggregate, one or more of the methodologies described herein may obviate a need for certain human efforts or resources that otherwise would be involved in generating the influence score. Furthermore, computing resources used by one or more machines, databases, or devices (e.g., within the network environment 100) may similarly be reduced (e.g., by predetermining rankings). Examples of such computing resources include processor cycles, network traffic, memory usage, data storage capacity, power consumption, and cooling capacity.

The influence score process 204, the ranking process 206, and the search process 208 allow job seekers, recruiters, and market analysts to quickly find accurate information (e.g., influential members) in the online social network 210. The user interface 202 provides structure to search results, which enables fast navigation and discovery. Furthermore, the search process 208 can improve the user experience by connecting the inquirer to the correct influential member based on the influence score.

Example Machine Architecture and Machine-Readable Medium

Figure 6:
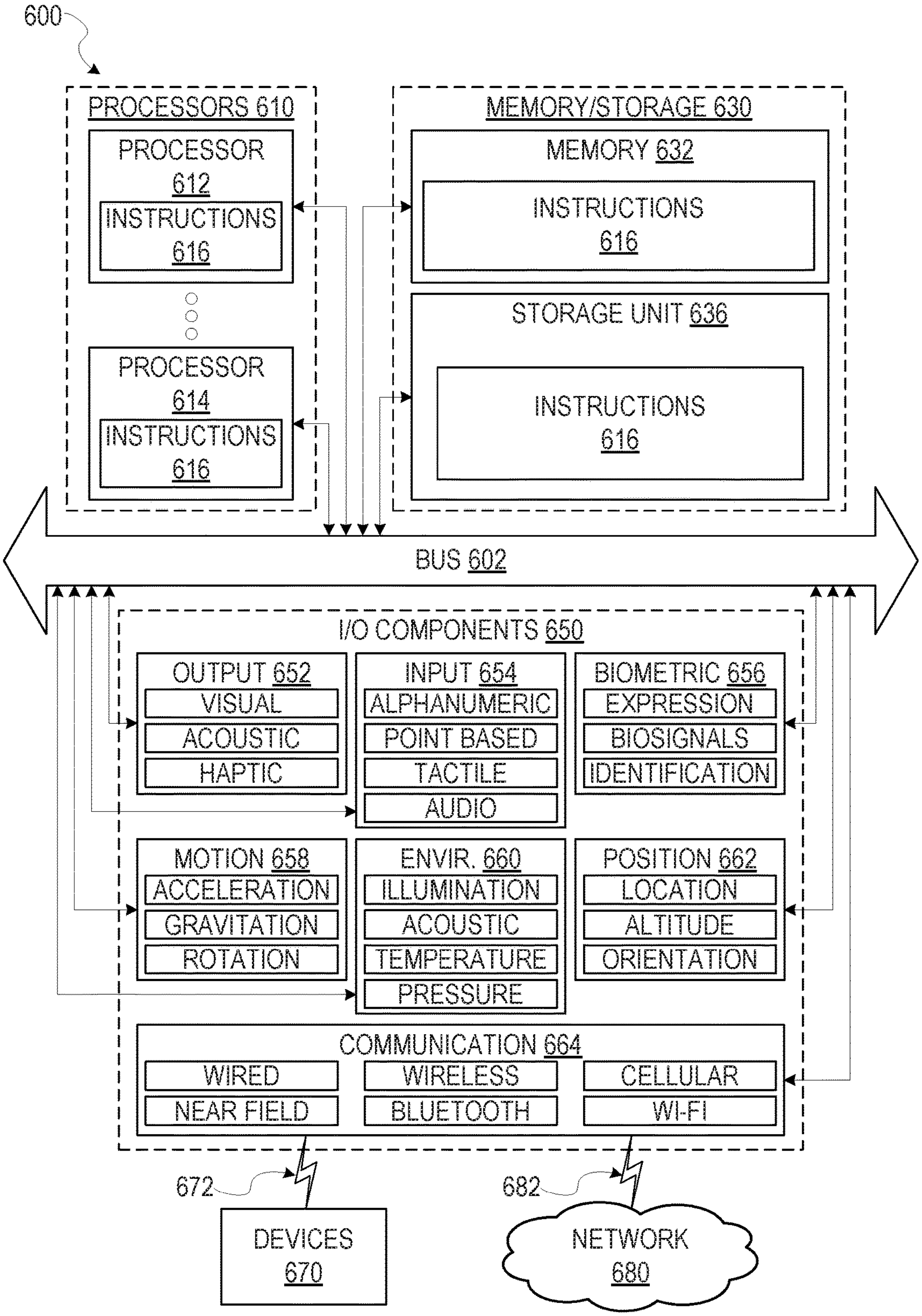
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 (including, e.g., user interface 202, influence score process 204, the ranking process 206, and the search process 208 of FIG. 2) to execute the flow diagrams of FIGS. 3 and 4. The instructions 616 transform the general, non-programmed machine 600 into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine 110 or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor 610, or any suitable combination thereof) may include, for example, a processor 612 and a processor 614 that may execute the instructions 616. The term "processor" is intended to include multi-core processors 610 that may comprise two or more independent processors 612, 614 (sometimes referred to as "cores") that may execute the instructions 616 contemporaneously. Although FIG. 6 shows multiple processors 610, the machine 600 may include a single processor 612 with a single core, a single processor 612 with multiple cores (e.g., a multi-core processor), multiple processors 612, 614 with a single core, multiple processors 612, 614 with multiples cores, or any combination thereof. For example, the operations described in method 300 and method 400 can be performed by one or more of the processors 610.

The memory/storage 630 may include a memory 632, such as a main memory or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media. In one example, the database 115 can be an example of the memory/storage 630.

As used herein, "machine-readable medium" means a device 130, 150 able to store the instructions 616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device 130, 150, as well as "cloud-based" storage systems or storage networks that include multiple storage apparatus or devices 130, 150. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or other suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)). For example, network 190 can be similar to the network 680, and the online social network 210 can include the communication components 664 to interface with network 680. Additionally, the influence score process 204 can access the member database 120 via the network 680 using communication components 664, as described at operation 320 in FIG. 3.

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the public switched telephone network (PSTN), a POTS network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Unless specifically stated otherwise, the terms "a" or "an" are herein used, as is common in patent documents, to include one or more than one instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 610 or a group of processors 610) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 610 or other programmable processor 610. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 610 configured by software to become a special-purpose processor, the general-purpose processor 610 may be configured as respectively different special-purpose processors (e.g., comprising different hardware modules) at different times. Software (e.g., a software module) may accordingly configure one or more processors 610, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 610 that are temporarily configured (e.g., by software) or permanently configured to perform the relevant operations. Whether temporarily or permanently configured, such processors 610 may constitute processor-implemented modules that operate to perform one or more operations or functions described herein. As used herein, "processor-implemented module" refers to a hardware module implemented using one or more processors 610.

Similarly, the methods described herein may be at least partially processor-implemented, a processor 610 being an example of hardware. For example, at least some of the operations of a method may be performed by one or more processors 610 or processor-implemented modules. As used herein, "processor-implemented module" refers to a hardware module in which the hardware includes one or more processors 610. Moreover, the one or more processors 610 may also operate to support performance of the relevant operations in a "cloud computing" environment or as a "software as a service" (SaaS). For example, at least some of the operations may be performed by a group of computers (as examples of machines 600 including processors 610), with these operations being accessible via a network 680 (e.g., the Internet) and via one or more appropriate interfaces (e.g., an application programming interface (API)).

The performance of certain operations may be distributed among the one or more processors 610, not only residing within a single machine 600, but deployed across a number of machines 600. In some example embodiments, the one or more processors 610 or processor-implemented modules may be located in a single geographic location (e.g., within a home environment, an office environment, or a server farm). In other example embodiments, the one or more processors 610 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 600. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 600 (e.g., a computer) that manipulates or transforms data represented as physical (e.g., electronic, magnetic, or optical) quantities within one or more memories 632 (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:

a member database storing member data of a plurality of members in an online social network, the member data having profile data and social graph data for the plurality of members;

one or more processors configured to:

receive a ranking request associated with a ranking of a first member, the social graph data for the first member having first-degree connections of the first member, wherein the ranking request includes a profile attribute associated with the first member;

determine a contribution factor for each first-degree connection of the first member, wherein the contribution factor is weighted based on a strength of connection for each first-degree connection;

determine a centrality score for the first member based on the contribution factor for each first-degree connection of the first member;

determine an expertise score for the first member based on the profile data of the first member, wherein the expertise score is an indication of a level of expertise of the first member;

calculate an influence score of the first member based on the centrality score and the expertise score;

determine a subgroup of members from the plurality of members, the subgroup of members having the profile attribute;

calculate an influence score for each member in the subgroup of members; and generate a ranking list of the first member and the subgroup of members based on the influence score of the first member and the influence score for each member in the subgroup of members; and a user interface configured to cause a presentation, on a display of a device, of the ranking of the first member based on the influence score, wherein the presentation includes the generated ranking list.

2. The system of claim 1, wherein the one or more processors are further configured to:

calculate an influence score for each first-degree connection of the first member; and generate a ranking list of the first member and the first-degree connections of the first member based on the influence score of the first member and the influence score for each first-degree connection of the first member; and wherein the presentation includes the generated ranking list.

3. The system of claim 1, wherein the profile attribute is an employer of the first member; and wherein the subgroup of members are other employees of the employer.

4. The system of claim 1, wherein the profile attribute is a job title of the first member; and wherein the subgroup of members are members having the job title listed on a profile page.

5. The system of claim 1, wherein the member data further includes a contribution factor for each first-degree connection of the first member; and wherein the contribution factor for each first-degree connection of the first member is accessed from the member database.

6. The system of claim 1, wherein the centrality score for the first member is calculated using an eigenvector centrality algorithm, wherein the contribution factor for each first-degree connection has an equal weight.

7. The system of claim 1, wherein the centrality score for the first member is calculated using a Katz centrality algorithm, wherein the centrality score is further based on contribution factors associated with second-degree connections of the first member.

8. The system of claim 1, wherein the centrality score for the first member is calculated is further based on a damping factor for each first-degree connection of the first member; and wherein the damping factor for each first-degree connection of the first member is based on a page rank value associated with a profile page of each first-degree connection of the first member.

9. The system of claim 1, wherein the centrality score for the first member is calculated using a strength of connection value, wherein the contribution factor for each first-degree connection is based on the strength of connection between the first member and a first-degree connection of the first member.

10. The system of claim 1, wherein the centrality score for the first member is determined by summing the contribution factors for each first-degree connection of the first member.

11. The system of claim 1, wherein the influence score is calculated by multiplying the centrality score for the first member by a first coefficient and multiplying the expertise score for the first member by a second coefficient.

12. The system of claim 1, wherein the profile data includes a first employer of the first member; and wherein the system further comprises a third-party database storing ranking data, the ranking data having an employer ranking; and wherein the one or more processors are further configured to:

access the employer ranking for the first employer of the first member; and update the expertise score for the first member based on the employer ranking for the first employer.

13. The system of claim 1, wherein the profile data includes a school attended by the first member, wherein the system further comprises a third-party database storing ranking data, the ranking data having a school ranking; and wherein the one or more processors are further configured to:

access the school ranking for the school attended by the first member; and update the expertise score for the first member based on the school ranking for the school attended by the first member.

14. The system of claim 1, wherein the profile data includes years of experience, and the expertise score is based on the years of experience.

15. The system of claim 1, wherein the profile data includes a company name and a job title, and the expertise score is based on the job title and a number of employees associated with the company name.

16. The system of claim 1, wherein the one or more processors are further configured to:

receive a search request of a member having a first name and a last name that is associated with the first member; and generate a search result based on the influence score of the first member; and wherein the user interface is further configured to present the generated search results.

17. A method comprising:

receiving a ranking request associated with a ranking of a first member, the social graph data for the first member having first-degree connections of the first member, wherein the ranking request includes a profile attribute associated with the first member;

determining a contribution factor for each first-degree connection of the first member, wherein the contribution factor is weighted based on a strength of connection for each first-degree connection;

determining a centrality score for the first member based on the contribution factor for each first-degree connection of the first member;

determining an expertise score for the first member based on the profile data of the first member, wherein the expertise score is an indication of a level of expertise of the first member;

calculating an influence score of the first member based on the centrality score and the expertise score;

determining a subgroup of members from the plurality of members, the subgroup of members having the profile attribute;

calculating an influence score for each member in the subgroup of members; and generating a ranking list of the first member and the subgroup of members based on the influence score of the first member and the influence score for each member in the subgroup of members; and causing a presentation, on a display of a device, of the ranking of the first member based on the influence score, wherein the presentation includes the generated ranking list.

18. The method of claim 17, wherein the ranking request includes a profile attribute associated with the first member, further comprising:

determining a subgroup of members from the plurality of members, the subgroup of members having the profile attribute;

calculating an influence score for each member in the subgroup of members; and generating a ranking list of the first member and the subgroup of members based on the influence score of the first member and the influence score for each member in the subgroup of members; and causing a presentation of the generated ranking list.

19. A non-transitory machine-readable storage medium comprising instructions that, when executed by one or more processors of a machine, cause the machine to perform operations comprising:

receiving a ranking request associated with a ranking of a first member, the social graph data for the first member having first-degree connections of the first member, wherein the ranking request includes a profile attribute associated with the first member;

determining a contribution factor for each first-degree connection of the first member, wherein the contribution factor is weighted based on a strength of connection for each first-degree connection;

determining a centrality score for the first member based on the contribution factor for each first-degree connection of the first member;

determining an expertise score for the first member based on the profile data of the first member, wherein the expertise score is an indication of a level of expertise of the first member;

calculating an influence score of the first member based on the centrality score and the expertise score;

determining a subgroup of members from the plurality of members, the subgroup of members having the profile attribute;

calculating an influence score for each member in the subgroup of members; and generating a ranking list of the first member and the subgroup of members based on the influence score of the first member and the influence score for each member in the subgroup of members; and causing a presentation, on a display of a device, of the ranking of the first member based on the influence score, wherein the presentation includes the generated ranking list.

* * * * *